United States Patent
DiVerdi et al.

(10) Patent No.: US 10,701,334 B2
(45) Date of Patent: Jun. 30, 2020

(54) VIRTUAL REALITY PARALLAX CORRECTION

(71) Applicant: Adobe Inc., San Jose, CA (US)

(72) Inventors: Stephen Joseph DiVerdi, Oakland, CA (US); Ana Belén Serrano Pacheu, Saragossa (ES); Aaron Phillip Hertzmann, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 166 days.

(21) Appl. No.: 15/730,478

(22) Filed: Oct. 11, 2017

(65) Prior Publication Data
US 2019/0110038 A1 Apr. 11, 2019

(51) Int. Cl.
| | |
|---|---|
| *H04N 13/02* | (2006.01) |
| *H04N 13/128* | (2018.01) |
| *G06T 15/20* | (2011.01) |
| *G02B 27/01* | (2006.01) |
| *G06N 3/02* | (2006.01) |
| *G06T 17/20* | (2006.01) |
| *G06N 3/04* | (2006.01) |

(Continued)

(52) U.S. Cl.
CPC ....... *H04N 13/128* (2018.05); *G02B 27/0172* (2013.01); *G06N 3/02* (2013.01); *G06T 15/20* (2013.01); *G06T 17/20* (2013.01); *G02B 27/017* (2013.01); *G06N 3/0454* (2013.01); *G06N 3/08* (2013.01); *H04N 2013/0081* (2013.01)

(58) Field of Classification Search
CPC ... G06F 3/04815; G02B 27/017; H04L 67/38; H04N 13/221; H04N 13/257; H04N 13/398; H04N 5/232; H04N 13/111

USPC .......................................................... 348/46
See application file for complete search history.

(56) References Cited

U.S. PATENT DOCUMENTS

| | | | | |
|---|---|---|---|---|
| 6,590,573 B1* | 7/2003 | Geshwind | ............... | G06T 19/00 345/419 |
| 2004/0027347 A1* | 2/2004 | Farsaie | ................ | H04N 13/221 345/419 |

(Continued)

FOREIGN PATENT DOCUMENTS

| | | |
|---|---|---|
| JP | 2014067372 | 4/2014 |
| WO | WO-2018213131 | 11/2018 |

OTHER PUBLICATIONS

"Combined Search and Examination Report", GB Application No. 1813076.5, dated Feb. 8, 2019, 7 pages.

(Continued)

*Primary Examiner* — Masum Billah
(74) *Attorney, Agent, or Firm* — SBMC

(57) ABSTRACT

Virtual reality parallax correction techniques and systems are described that are configured to correct parallax for VR digital content captured from a single point of origin. In one example, a parallax correction module is employed to correct artifacts caused in a change from a point of origin that corresponds to the VR digital content to a new viewpoint with respect to an output of the VR digital content. A variety of techniques may be employed by the parallax correction module to correct parallax. Examples of these techniques include depth filtering, boundary identification, smear detection, mesh cutting, confidence estimation, blurring, and error diffusion as further described in the following sections.

20 Claims, 15 Drawing Sheets

(51) Int. Cl.
G06N 3/08 (2006.01)
H04N 13/00 (2018.01)

(56) References Cited

U.S. PATENT DOCUMENTS

| 2005/0089212 A1* | 4/2005 | Mashitani ............ H04N 13/296 |
| | | 382/154 |
| 2010/0225743 A1 | 9/2010 | Florencio et al. |
| 2015/0235408 A1 | 8/2015 | Gross et al. |

OTHER PUBLICATIONS

"Raytrix—3D Light-Field—Micro Bin-Picking", Retrieved at: https://raytrix.de/immerge—on Nov. 14, 2019, 1 page.
Buyssens, "Depth-Aware Patch-based Image Disocclusion for Virtual View Synthesis", Sep. 30, 2015, 5 pages.
Chaurasia, "Depth Synthesis and Local Warps for Plausible Image-based Navigation", Jun. 1, 2013, 12 pages.
Goesele, "Ambient Point Clouds for View Interpolation", Jul. 1, 2010, 6 pages.
Huang, "6-DOF VR Videos with a Single 360-Camera", Mar. 2017, 9 pages.
Huang, "Temporally Coherent Completion of Dynamic Video", Nov. 11, 2016, 11 pages.
Kellnhofer, "3DTV at Home: Eulerian-Lagrangian Stereo-to-Multiview Conversion", Jul. 20, 2017, 13 pages.
Sang, "Fast & Beautiful Surfel Rendering on a Smartphone", Apr. 24, 2017, 25 pages.
Zheng, "Layered Depth Panoramas", Jun. 2007, 9 pages.
Zitnick, "High-quality Video View Interpolation Using a Layered Representation", ACM Trans. Graph., Aug. 2004, 9 pages.

* cited by examiner

1300

VIRTUAL REALITY PARALLAX CORRECTION

BACKGROUND

Virtual reality (VR) digital content, such as VR digital video or VR digital images, employs a camera system (e.g., an array of digital cameras) to capture an image scene of a physical environment. As a result, location of the camera system within the physical environment acts as a point of origin in relation to the VR digital content when viewing this content. To render the VR digital content, for instance, left and right eye panorama digital images are displayed by a VR device as stereoscopic images to support an appearance of depth. As a result, a user may "look around" at different orientations with respect to this display at the point of origin through interaction with the VR device, e.g., through rotational movement of the user's head.

However, challenges are introduced by this technique because the camera system is limited to capture of physical environment from the point of origin and thus display of this content is limited to the point of origin by conventional VR devices. Although rotational head movement of the user may be used to view different parts of the image scene correctly, for instance, repositioning (e.g., translation) of the user's head (e.g., side-to-side, up-and-down) is either not supported or results in failure to correctly update output of the VR digital content by conventional VR devices. This is because conventional VR devices do not update depth-dependent parallax correctly, in which objects in the image scene near the point of origin (e.g., the camera) exhibit a greater amount of movement than objects further away from the point of origin in the image scene. The parallax effect is a strong depth cue that is used by humans to correctly interpret real scenes. Therefore, failure to correctly reproduce the parallax depth cue by conventional VR devices compromises realism of the image scene and may even cause user nausea because movement of the user's head between different positions is not followed by what is being viewed by the user.

Conventional techniques and systems used to address this challenge involve significantly more laborious capture of image scenes and/or significantly more expensive devices. In one conventional example, a camera system is used to capture multiple images of a static scene from different positions. Thus, this conventional technique is limited to static scenes and as a result is not suitable for other types of VR digital content, such as VR digital video. In another conventional example, a light field camera is used to capture incident light of an image scene at multiple different positions. Light field cameras, however, are orders of magnitude more expensive that camera systems used to capture image scenes from a single point of origin and have limited availability.

SUMMARY

Virtual reality parallax correction techniques and systems are described that are configured to correct parallax for VR digital content captured from a single point of origin (e.g., for each frame of a video or static digital image) to support changes in position (e.g., translation) from that single point of origin. In this way, these techniques are applicable to a wide range of VR digital content that may be captured using common devices. Further, these techniques improve user interaction with the VR digital content to appear natural and mimic real world interaction with an image scene captured by the VR digital content and may do so in real time, which is not possible using conventional techniques.

In one example, a parallax correction module is employed to correct artifacts caused in a change in viewpoint with respect to an output of the VR digital content, e.g., translational repositioning of a user's head from side-to-side, up-and-down, and so forth. A variety of techniques may be employed by the parallax correction module to correct these artifacts and address parallax. Examples of these techniques include depth filtering, boundary identification, smear detection, mesh cutting, confidence estimation, blurring, and error diffusion as further described in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
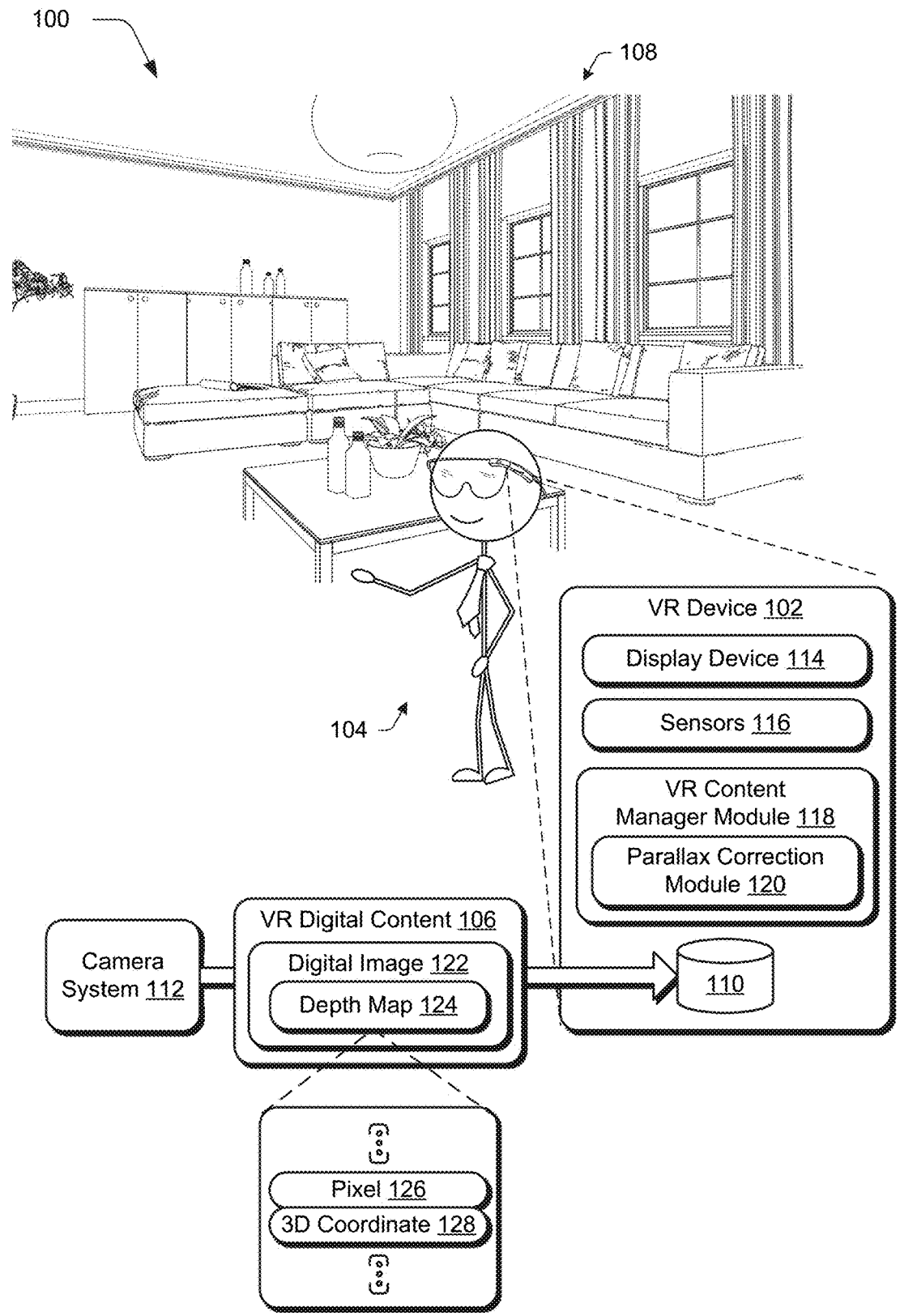
FIG. 1 is an illustration of an environment in an example implementation that is operable to employ virtual reality parallax correction techniques described herein.

Virtual reality parallax correction techniques and systems are described that are configured to correct parallax for VR digital content having a single point of origin (e.g., for each frame of a video or static digital image) to support changes in position (e.g., translation) from that single point of origin. This may include capture from a single point of origin, e.g., a camera system, offline rendering of computer graphics, and so forth In this way, these techniques are applicable to a wide range of VR digital content that may be captured using common devices from a single point of origin, and may do so in real time. Further, these techniques improve user interaction with the VR digital content to appear natural and mimic real world interaction with an image scene captured by the VR digital content, which is not possible using conventional techniques.

In an example, VR digital content is received by a VR device, e.g., VR goggles for viewing of VR digital video. The VR digital content is associated with a depth map, which may be captured along with the VR digital content by a camera system, computed from stereoscopic digital images included as part of the VR digital content (e.g., based on disparity), and so forth. The VR digital content in this example is captured from a single point of origin, e.g., a single point of origin for respective frames of a VR digital video. To render the VR digital content, the VR device generates an origin triangle mesh that includes pixels and three dimensional locations of those pixels.

The VR device in this example then detects a change in position of a user using one or more sensors, e.g., as a change in position as translating side-to-side, up-and-down, and so forth using an accelerometer, radar device, and so forth. Thus, this change in position of the user differs from a change in orientation of the user, e.g., used to "look around" a display of the VR digital content, although a change in orientation may also be detected and addressed by the VR device in this example.

In response, a VR content manager module of the VR device generates a perspective triangle mesh to address this change in position from the origin triangle mesh used to render the VR digital content at the origin as described above. The perspective triangle mesh, for instance, defines a topology in three dimensions of the origin triangle mesh as viewed based on this change in position. This perspective triangle mesh, however, may introduce artifacts due to this change through incorrect simulation of parallax in the perspective triangle mesh.

Accordingly, a parallax correction module is employed to correct these artifacts such that a corrected parallax triangle mesh is generated to render the VR digital content to appear natural when viewed by a user. A variety of techniques may be employed by the parallax correction module to correct parallax, examples of which are described in the following sections and include depth filtering (FIG. 6), boundary identification (FIG. 7), smear detection (FIG. 8), confidence estimation (FIGS. 9 and 10), mesh cutting (FIG. 11), blurring (FIG. 12), and error diffusion (FIG. 13). These techniques may be employed alone or in combination by the parallax correction module of the VR device in real time, and thus is computationally efficient and improves operation of the VR device. Further, these techniques are applicable to VR digital content that is captured at a single point of origin and thus may be employed by a wide range of existing VR digital content, which is not possible using conventional VR devices.

In the following discussion, an example environment is first described that may employ the techniques described herein. Examples of parallax correction techniques are then described as employing this environment. An example procedure is also described which may be performed in the example environment as well as other environments. Consequently, performance of the example procedure is not limited to the example environment and the example environment is not limited to performance of the example procedure.

Example Environment

FIG. 1 is an illustration of a digital medium environment 100 in an example implementation that is operable to employ virtual reality parallax correction techniques described herein. The illustrated environment 100 includes a VR device 102 and user 104 that is illustrated as interacting with a rendered output 108 of the VR digital content 106 by the VR device 102, e.g., a living room. The VR digital content 106 is also illustrated as stored in a storage device 110, e.g., a computer-readable storage medium as further described in reference to FIG. 15, as received from a camera system 112.

The VR device 102 may be configured in a variety of ways, such as glasses or goggles that are to be worn by on the head of the user 104 as illustrated, mobile phones or tablets, wearable devices, stand-alone devices (e.g., signs), and so forth. The VR device 102 in this example includes a display device 114, sensors 116, a VR content manager module 118, and a parallax correction module 120.

The camera system 112 is configured to capture digital images 122 as part of the VR digital content 106. This may be performed as a single stereo red, green, blue (RGB) video and is associated with a depth map 124, which may or may not be captured separately as part of the VR digital content 106. The VR device 102, for instance, may include sensors 116 such as structured grid arrays, time-of-flight cameras, and so on to detect 3D coordinates 128 of pixels 126 included in the digital image 122. In another instance, the depth map 124 and associated 3D coordinates 128 of the pixels 126 are determined from the digital images 122, itself, e.g., based on disparity exhibited by corresponding pixels 126 in stereoscopic digital images 122. A variety of other examples are also contemplated, including use of neural networks as part of machine learning that are used to infer depth and thus 3D coordinates of respective pixels 126 in the digital images 122.

The VR digital content 106 is also configured to be rendered by the VR device 102. This rendering may be accomplished through use of a variety of output devices of the VR device 102. An example of this is illustrated as a display device 114 that is configured to support visual output of the VR digital content 106 to the user 104, e.g., to left and right eyes of the user 104 using stereoscopic digital images 122. Other examples of output devices that may be included as part of the VR device 102 include audio output (e.g., via speakers), tactile output (e.g., via a haptic device), and so forth. In this way, output of VR digital content 106 may be configured to support an immersive experience in which users "feel like they are there."

In this example, the VR digital content 106 is configured such that each digital image 112 (e.g., either alone or part of a sequence of frames) is captured from a single point of view (i.e., location), called the point of origin for the digital image 122 in the following. The digital image 122, for instance, may be configured as a panoramic image that supports view of different portions of the image through rotation movement of the user's 104 head, e.g., to look around at different parts of a living room in the illustrated example.

As previously described, this limitation of the VR digital content 106 presents challenges to conventional VR devices to support changes in position, i.e., translational movement side-to-side, up-and-down, and so forth from the point of origin. The VR device 102, for instance, may detect a change in position of the user 104 using the sensors 116 from one location to another with respect to the rendered output 108 of the VR digital content, e.g., using an accelerometer, radar device, and so forth. Thus, this change in position of the user 104 differs from a change in orientation of the user 104 with respect to the rendered output 108, in which, the user 104 remains at the point of origin.

In response, the VR content manager module 118 simulates parallax to address this change in position. However, this may result in artifacts that are readily noticeable by the user 104, e.g., jagged edges along a wall, connected objects that are not otherwise connected in real life, and so forth. Accordingly, a parallax correction module 120 is employed by the VR device 102 such that the VR digital content 106, when rendered, addresses this change in position and appears realistic and natural.

Figure 2:
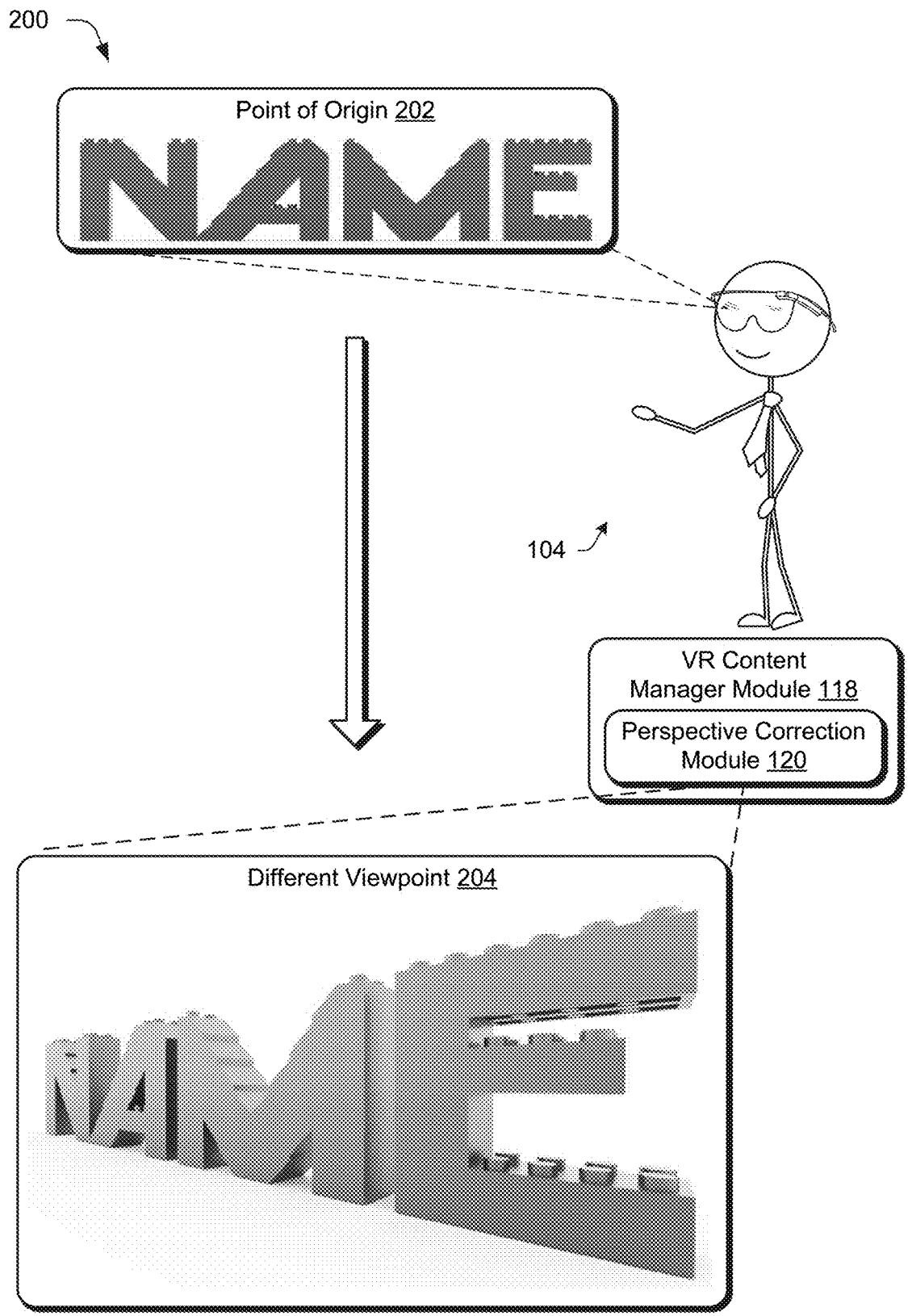
FIG. 2 describes an example of a change in position (e.g., translational movement) from a point of origin used to view VR digital content to a different viewpoint.

FIG. 2, for instance, depicts an example 200 of a change in position (e.g., translational movement) from a point of origin 202 used to view the VR digital content 106 to a different viewpoint 204. Thus, as illustrated in this example, a perspective of the user 104 changes in relation to the output of the VR digital content 106 by translation movement from one location to another, e.g., differs from the point of origin. This differs from changes in orientation in which different portions of the VR digital content 106 are viewed by rotational but not translation movement, e.g., to "look around" in a room. Thus, these techniques are applicable to VR digital content 106 that is captured at a single point of origin and thus may be employed by a wide range of existing VR digital content 106, which is not possible using conventional VR devices that require specialized devices. These specialized devices also require complex storage mechanisms that consume more computing and storage resources that are less well understood than a compact 3D video representation as an equirectangular projection (i.e., a spherical panorama) as may be employed by the techniques described herein. Further, the following techniques may do so in real time by the VR device 102 and thus does not require pre-processing of the VR digital content 106 before initiating output.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 3:
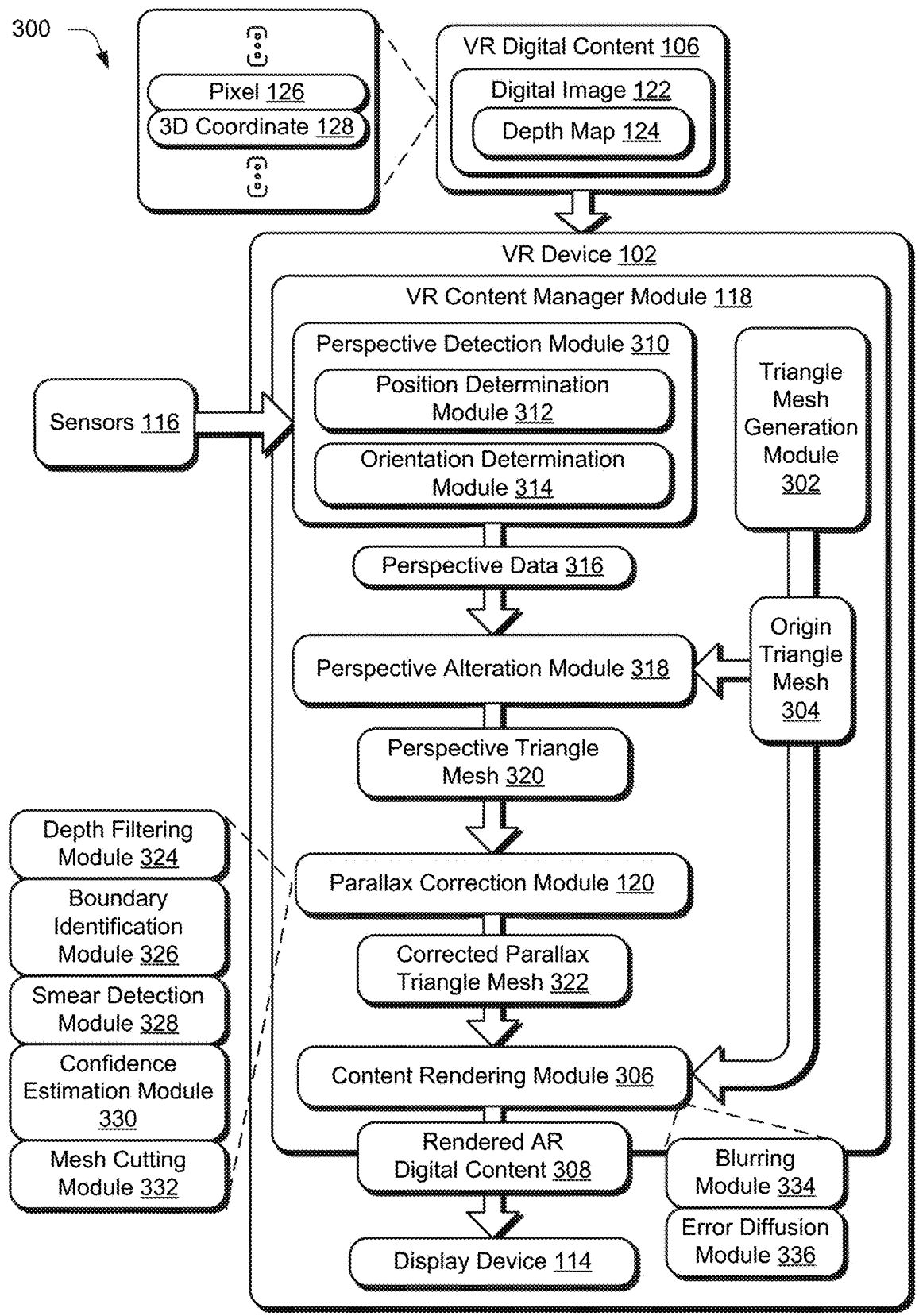
FIG. 3 depicts a system in an example implementation showing operation of a content manager module and parallax correction module of FIG. 1 as well as a content rendering module in greater detail.

FIG. 3 depicts a system 300 in an example implementation showing operation of the VR content manager module 118 and parallax correction module 120 in greater detail. To begin, VR digital content 106 is received by the VR content manager module 118. The VR digital content 106, for instance, may be captured by the camera system 112 of FIG. 1.

The VR digital content 106 includes a digital image 122 and a depth map 124. The depth map 124 may be generated in a variety of ways. In a first example, the depth map 124 is generated using depth sensors, such as structured light grid devices, time-of-flight cameras, radar techniques (e.g., through broadcast of Wi-Fi signals), and so forth. In another example, the depth map 124 is generated based on the digital images 122, themselves, such as to use standard computer vision techniques to match common points between the images to compute their disparities and thus their depths. Regardless of whether the depth map is captured by hardware or computed using computer vision techniques, the depth map 124 may encode the disparities of pixels as intensities.

In this example, rendering of the VR digital content 106 by the VR device 102 begins at a point of origin such that the VR digital content 106 is rendered as originally captured by a respective camera system. To do so, the VR digital content 106 is processed by a triangle mesh generation module 302 to generate an origin triangle mesh 304. The origin triangle mesh 304 is generated to connect pixels 126 at corresponding 3D coordinates to each other, e.g., to treat RGBD digital video, where each pixel 126 has "X" and "Y" coordinates as well as a depth "Z" value, along with a vertex RGB color value. Other techniques are also contemplated to describe three-dimensional coordinates and color values. The origin triangle mesh 304 is then rendered by a content rendering module 306 to generate rendered VR digital content 308 for output by the display device 114 as a topography for viewing by the user 104, e.g., as stereoscopic digital images 122 to support an appearance of depth.

The VR content manager module 118 also includes a perspective detection module 310, which includes a position determination module 312 as well as an orientation determination module 314. The perspective determination module 312 is configured in this instance to detect when to undergo a change in a user's 104 perspective due to movement away from a point of origin with respect to an output of the VR digital content 106. The perspective detection module 310, for instance, may receive data (e.g., via an API) or signals from the sensors 116, and from this, determine a change in position (e.g., as translational movement) as contrasted with a change in orientation.

Figure 4:
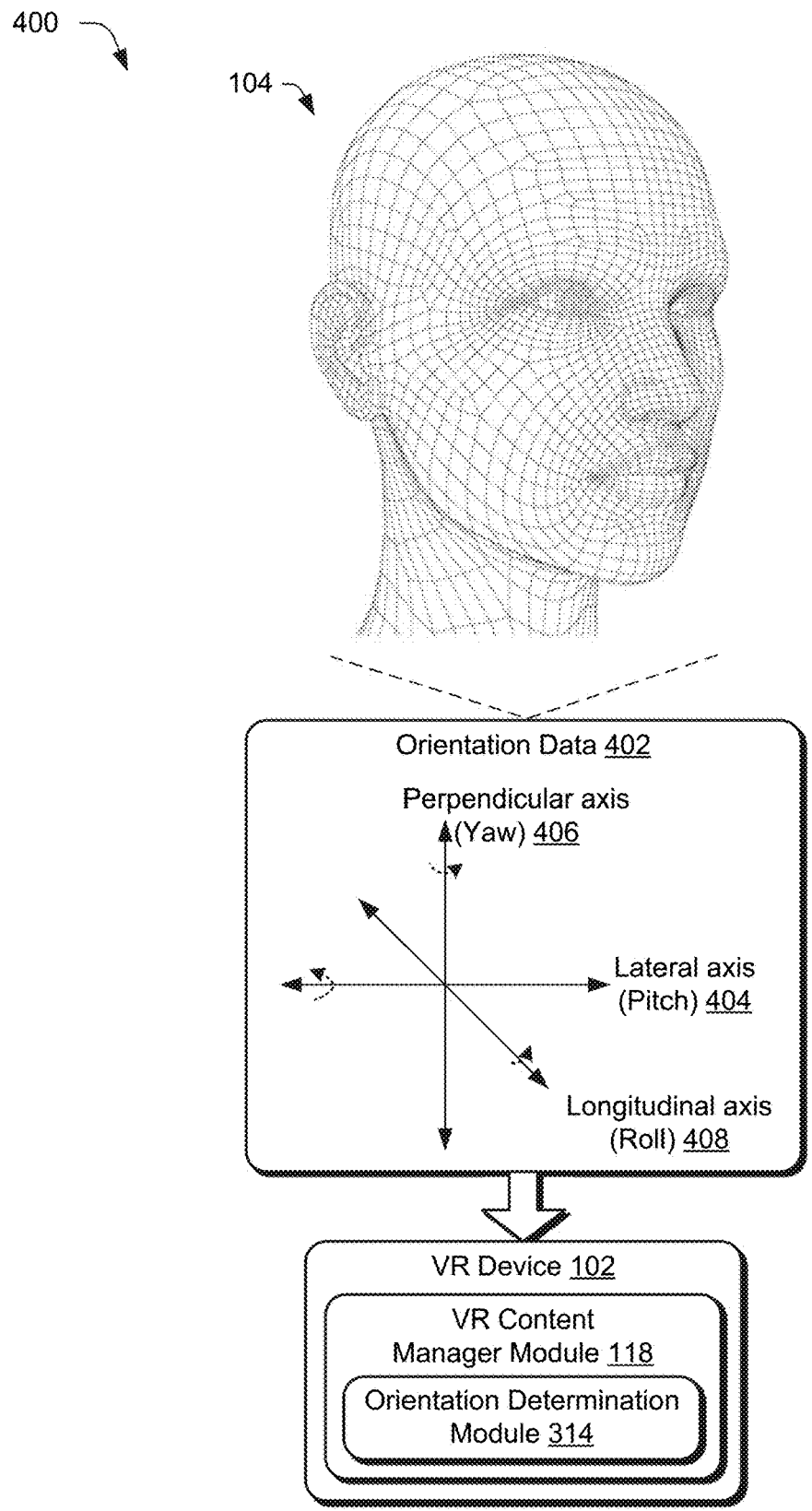
FIG. 4 depicts an example implementation showing a change in orientation with respect to an output of VR digital content.

As shown in an example implementation 400 of FIG. 4, for instance, the sensors 116 are configured to generate orientation data 402 that is usable by the orientation determination module 314 to track a likely orientation of a head of the user 104, e.g., in three dimensional space. In this illustrated example, this is performed to support three degrees of freedom (3DoF) as rotation about a lateral axis 404 (i.e., pitch), perpendicular axis 406 (i.e., yaw), and longitudinal axis 408 (i.e., roll). As a result, the orientation data 402 is usable to describe rotational head movements of the user 104 at a point of origin with respect to the capture and output of the VR digital content 106.

The orientation data 402 may be generated by a variety of types of sensors 202, both singly and in combination. For example, the sensors 116 may be configured as a gyroscope, accelerometer, magnetometer, inertial sensor, and so forth to determine movement associated with the VR device 102. This may include movement of the VR device 102 itself as a whole (e.g., head movement) and/or a controller communicatively coupled to the VR device 102, e.g., through use of one or more handheld controllers. In another example of a headset, light emitting diodes (LEDs) are disposed around a periphery of a headset to support three hundred and sixty degree head tracking through use of an external camera that detects light emitted from these diodes.

Other examples include use of the sensor 116 as a camera (e.g., infrared camera) to detect landmarks in a physical environment, in which, the VR device 102 is disposed (e.g., corners of the illustrated table of FIG. 1) and detect movement in relation to those landmarks through capture of successive digital images 122. A variety of other examples are also contemplated, including eye tracking in which a camera pointed towards an eye of the user 104 (e.g., as an infrared sensor) to determine "where the user is looking" with respect to portions of the display device 114.

Regardless of a format of the orientation data 402, the orientation determination module 314 is configured to abstract the orientation data 402 into a form that describes the orientation that is to be used by the VR content rendering module 306 to render respective portions of the VR digital content 106. The orientation data 402, for instance, may indicate changes to orientations that are usable to navigate between respect portions of a frame of the VR digital content 106 at a point of origin. In this way, the orientation data 402 is usable to control which portions of the VR digital content 106 (e.g., portions of the digital image 122) are and are not rendered by the display device 114 at a point of origin with respect to the VR digital content 106.

Figure 5:
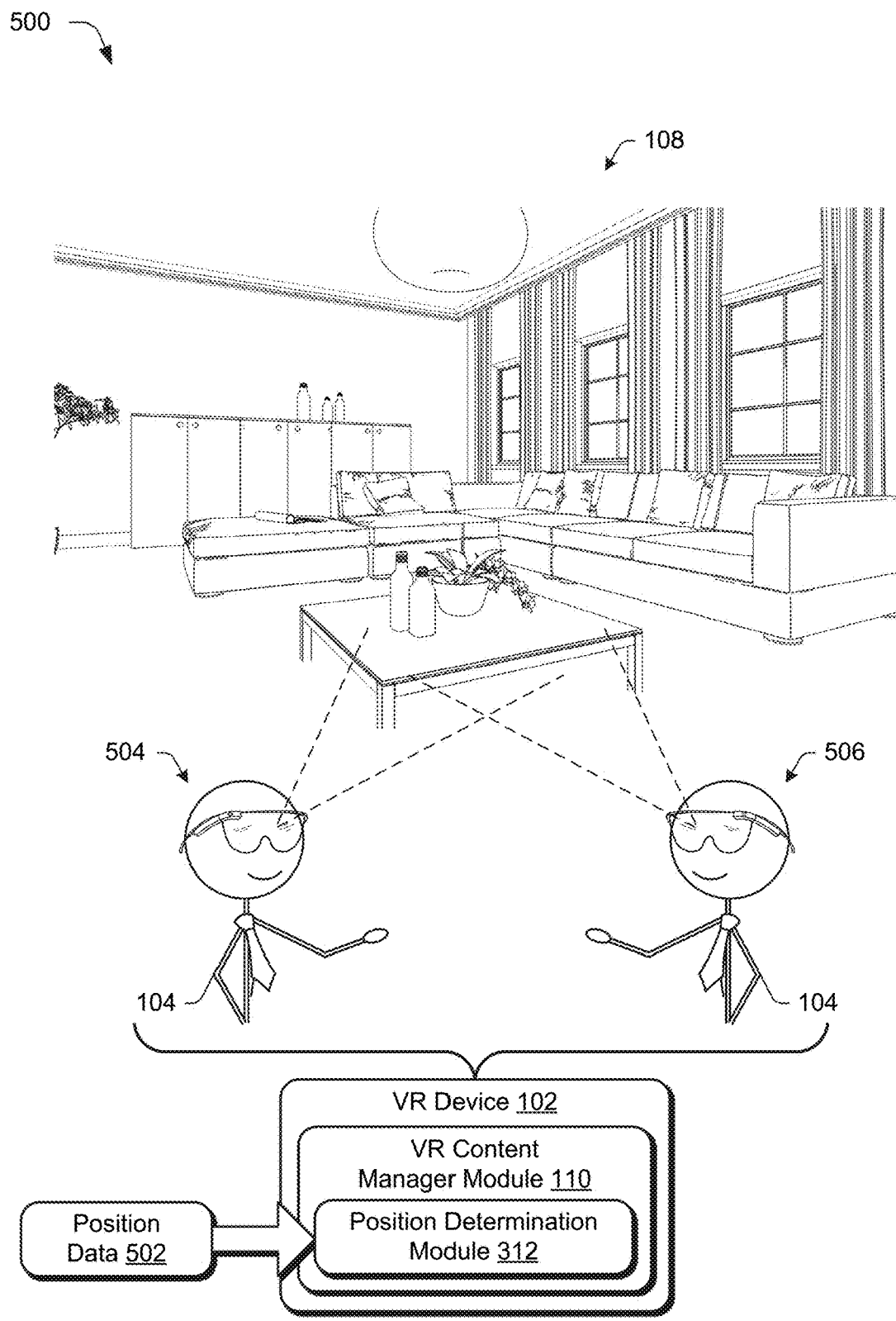
FIG. 5 depicts an example implementation showing a change in position with respect to an output of VR digital content.

In the example implementation 500 of FIG. 5, the sensors 116 are configured to output position data 502 that is usable by the position determination module 312 to determine a change in position (e.g., through translational movement) such that different perspectives are to be achieved with respect to a rendered output 108 of the VR digital content 106. In the illustrated example, for instance, the user 104 moves from a point of origin 504 with respect to how the VR digital content 106 was captured to a different location 506 that is not the point of origin 506 through translational movement. This change in location may be detected by the sensors 116 in a variety of different ways, such as through use of gyroscope, accelerometer, magnetometer, inertial sensor, handheld controllers, landmark detection using cameras, and so forth to determine movement associated with the VR device 102. Thus, this change in position and according change in perspective in relation to the VR digital content 106 differs from the change in orientation of FIG. 4 in which the user remains at a point of origin, at which, the VR digital content 106 was captured.

Returning again to FIG. 3, perspective data 316 is generated by the perspective detection module 310 that describes this change in perspective caused by movement away from the point of origin, e.g., a three dimensional position of a viewer with respect to the VR digital content 106. Orientation data 402 may also be generated to describe changes in orientation, also. The perspective data 316 is then received as an input by the perspective alternation module 318 and used to generate a perspective triangle mesh 320 using the origin triangle mesh 304.

The perspective alteration module 318, for instance, may generate the perspective triangle mesh 320 to address how a perspective of a viewer changed with respect to the origin triangle mesh 304. This is performed based on a change in three dimensional coordinates from the point of origin to the location described by the perspective data 316 and how that location corresponds to 3D coordinates 128 of the pixels 126.

As previously described, however, this may cause introduction of artifacts as part of the perspective triangle mesh 320 that when rendered are visible to a user. These artifacts have caused conventional techniques and systems to forgo such processing, and instead rely on expensive cameras or tedious capture of images from different perspectives, which does not support video. Accordingly, in this example a parallax correction module 120 is configured to generate a corrected parallax triangle mesh 322 to remove or lessen visibility of artifacts in the perspective triangle mesh 320.

The parallax correction module 120 may employ a variety of functionality to correct parallax. Examples of this functionality are represented by corresponding modules and discussed in greater detail in the following description, include a depth filtering module 324 (FIG. 6), boundary identification module 326 (FIG. 7), smear detection module 328 (FIG. 8), confidence estimation module 330 (FIGS. 9 and 10), and mesh cutting module 332 (FIG. 11). This also includes correction techniques employed by the content rendering module 306 as part of rendering the VR digital content 106, examples of which include a blurring module 334 (FIG. 12) and an error diffusion module 336 (FIG. 13). This functionality as represented by corresponding modules may be implemented singly or in combination to correct parallax in the perspective triangle mesh 320 to reduce visibility of artifacts caused by a change in position in viewing a topography of the mesh.

Figure 6:
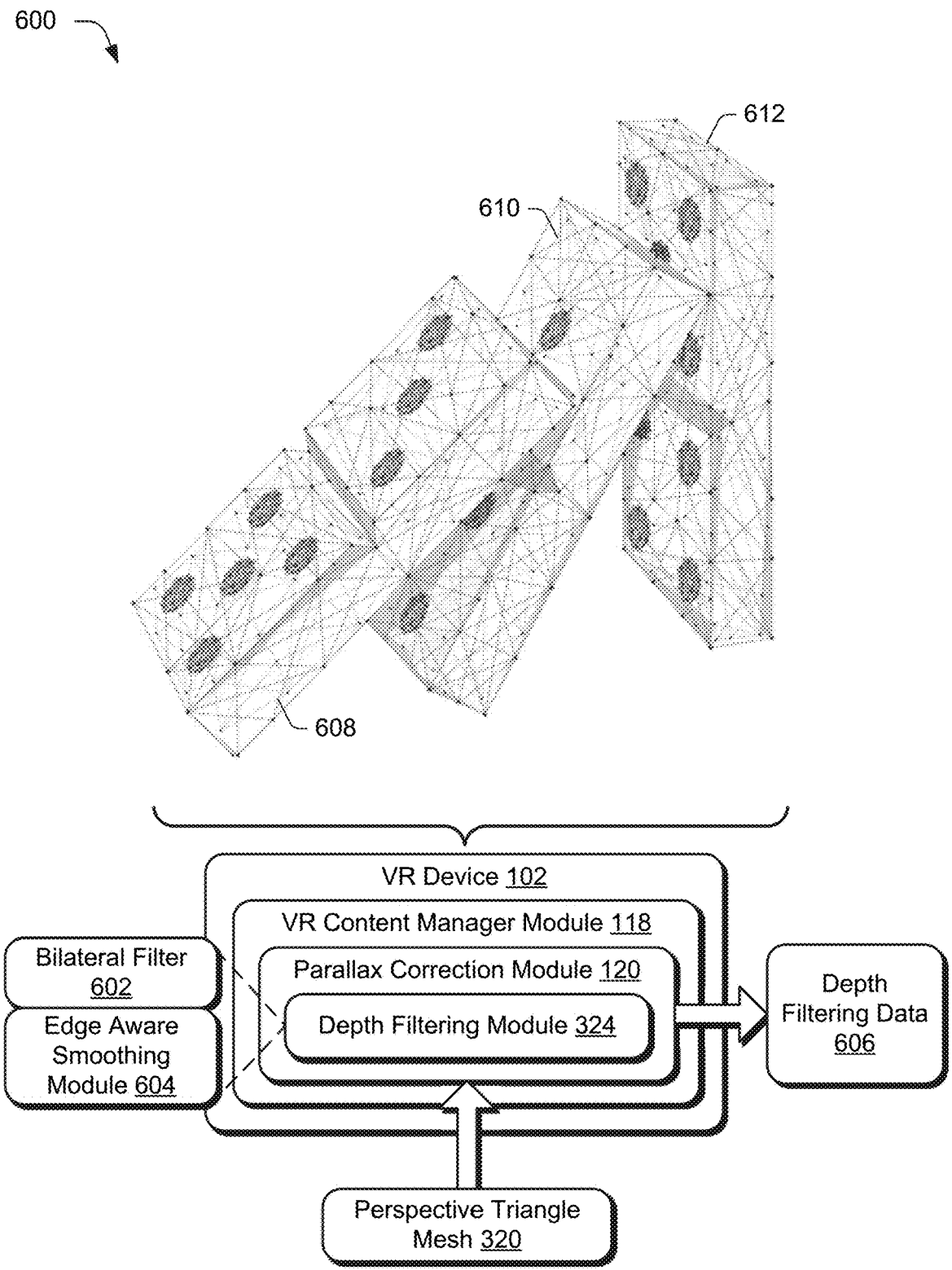
FIG. 6 depicts an example implementation showing operation of a depth filtering module of the parallax correction module in greater detail.

FIG. 6 depicts an example implementation 600 showing operation of the depth filtering module 324 of the parallax correction module 120 in greater detail. In practice, depth errors of the perspective triangle mesh 320 may be small and may involve bleeding of edges of triangles into one another. Therefore, in this instance the depth filtering module 324 employs a bilateral filter 602 and edge aware smoothing module 604 to generate depth filtering data 606 to both smooth regions and emphasize discontinuities involving depth in the perspective triangle mesh 320.

The bilateral filter 602, for instance, may be employed by the depth filtering module 120 as a non-linear and noise-reducing smoothing filter for a topography of the perspective triangle mesh 320. To do so, an intensity of each pixel of the mesh is replaced with a weighted average of intensity values from nearby pixels. The weight, for instance, may be based on a Gaussian distribution and also address radiometric differences such as range differences, color intensity, depth distance, and so on as part of a six dimensional function. This may be used to smooth pixels 608 on the same object or similar depth, but is not used to smooth pixels 610, 612 for different objects or significantly different depths. In this way, the depth filtering module 324 may reduce artifacts caused as part of generation of the perspective triangle mesh 320.

Figure 7:
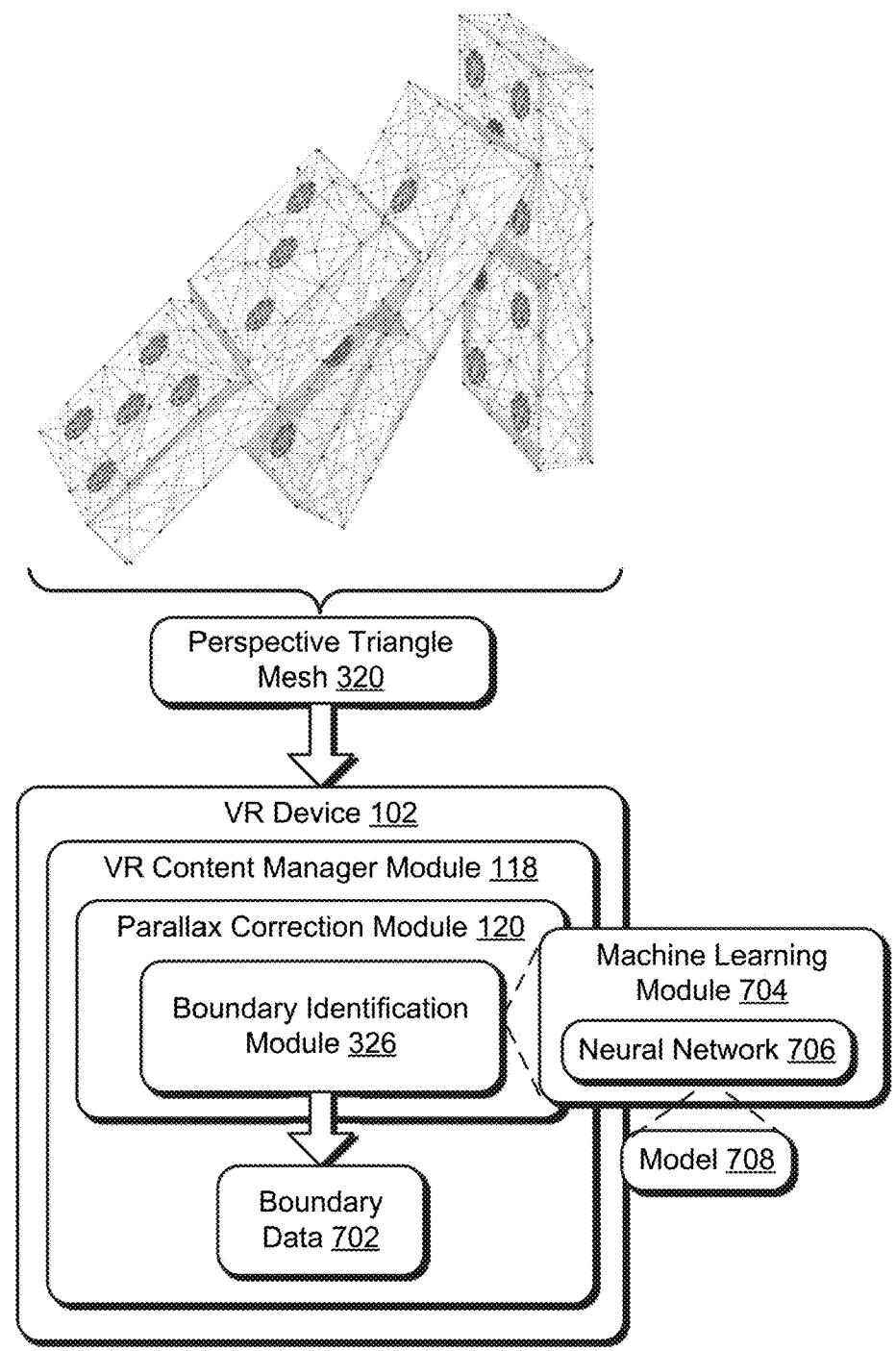
FIG. 7 depicts an example implementation showing operation of a boundary identification module of the parallax correction module in greater detail.

FIG. 7 depicts an example implementation 700 showing operation of the boundary identification module 326 of the parallax correction module 120 in greater detail. In this example, the boundary identification module 326 is configured to generate boundary data 702 through use of a machine learning module 704 that implements a neural network 706. The neural network 706 includes a model 708 trained using machine learning on training digital images to identify depth discontinuities in digital images, e.g., formed from the perspective triangle mesh 320. A variety of neural networks 706 may be employed, such as deep convolutional neural networks, convolutional neural networks, supervised neural networks, and so on.

The boundary data 702, as identifying these boundaries, may then be used by the parallax correction module 120 in a variety of ways. In one example, the boundary data 702 is used to segment a depth map and improve a smoothing result as described above by adding stronger edge constraints to achieve better sharpening of edges and reduce bleeding. In another example, the boundary data 702 is used to cut the mesh by the mesh cutting module 332, which is described in greater detail in relation to FIG. 11. Other examples are also contemplated, including use of tools that are made available via a user interface to manually adjust the boundary data 704.

Figure 8:
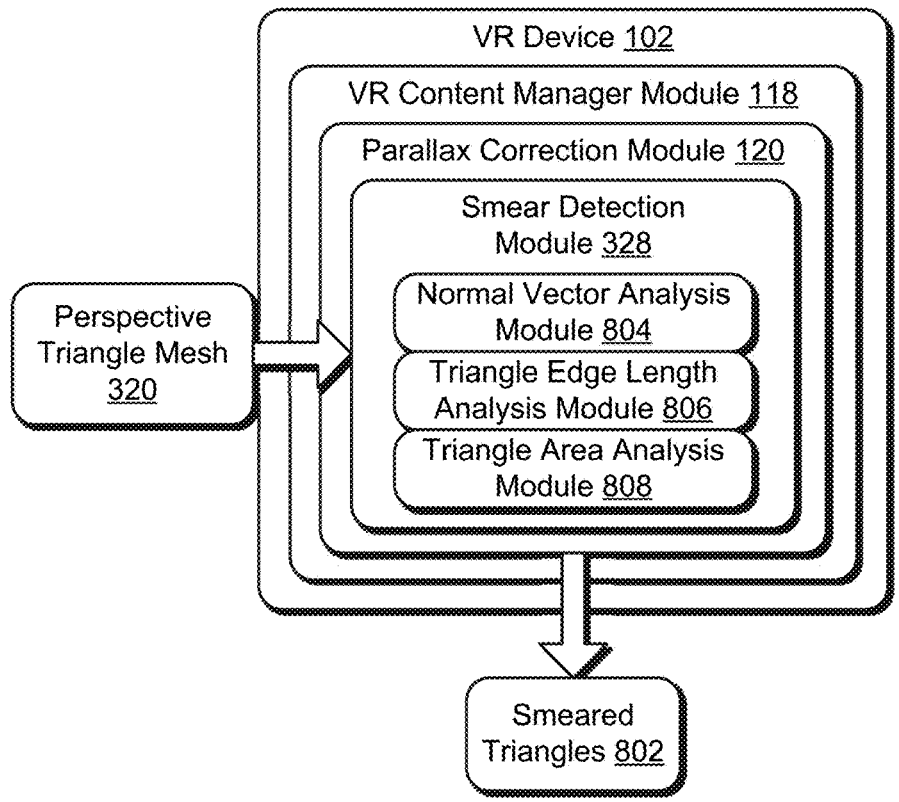
FIG. 8 depicts an example implementation showing operation of a smear detection module of the parallax correction module in greater detail.

FIG. 8 depicts an example implementation 800 showing operation of the smear detection module 328 of the parallax correction module 120 in greater detail. As part of generating the perspective triangle mesh 320, a mesh-topology is created in which each pixel is connected to each adjacent pixel, even if those pixels are on opposite sides of a depth discontinuity (e.g., a silhouette of a person in front of a background), which creates erroneous "smeared" triangles. Accordingly, the smear detection module 328 is configured to identify smeared triangles 802 in the perspective triangle mesh 320, which may then be corrected, e.g., through filtering, cutting the mesh as described in relation to FIG. 11, and so forth.

The smear detection module 328 may identify the smeared triangles 802 in a variety of ways. In one example, a normal vector analysis module 804 is used to identify the smeared triangles as having a surface normal that is close to perpendicular (e.g., within a threshold amount) to a view direction. In another example, a triangle edge length analysis module 806 is employed to identify the smeared triangles as having at least one edge that is over a threshold length. In a further example, a triangle area analysis module 808 is used to identify smeared triangles 802 as having a surface area that is over a threshold amount. The smeared triangles 802 thus define depth discontinuities 810 in the perspective triangle mesh 320 that may then be corrected by filtering and/or mesh cutting.

Figure 9:
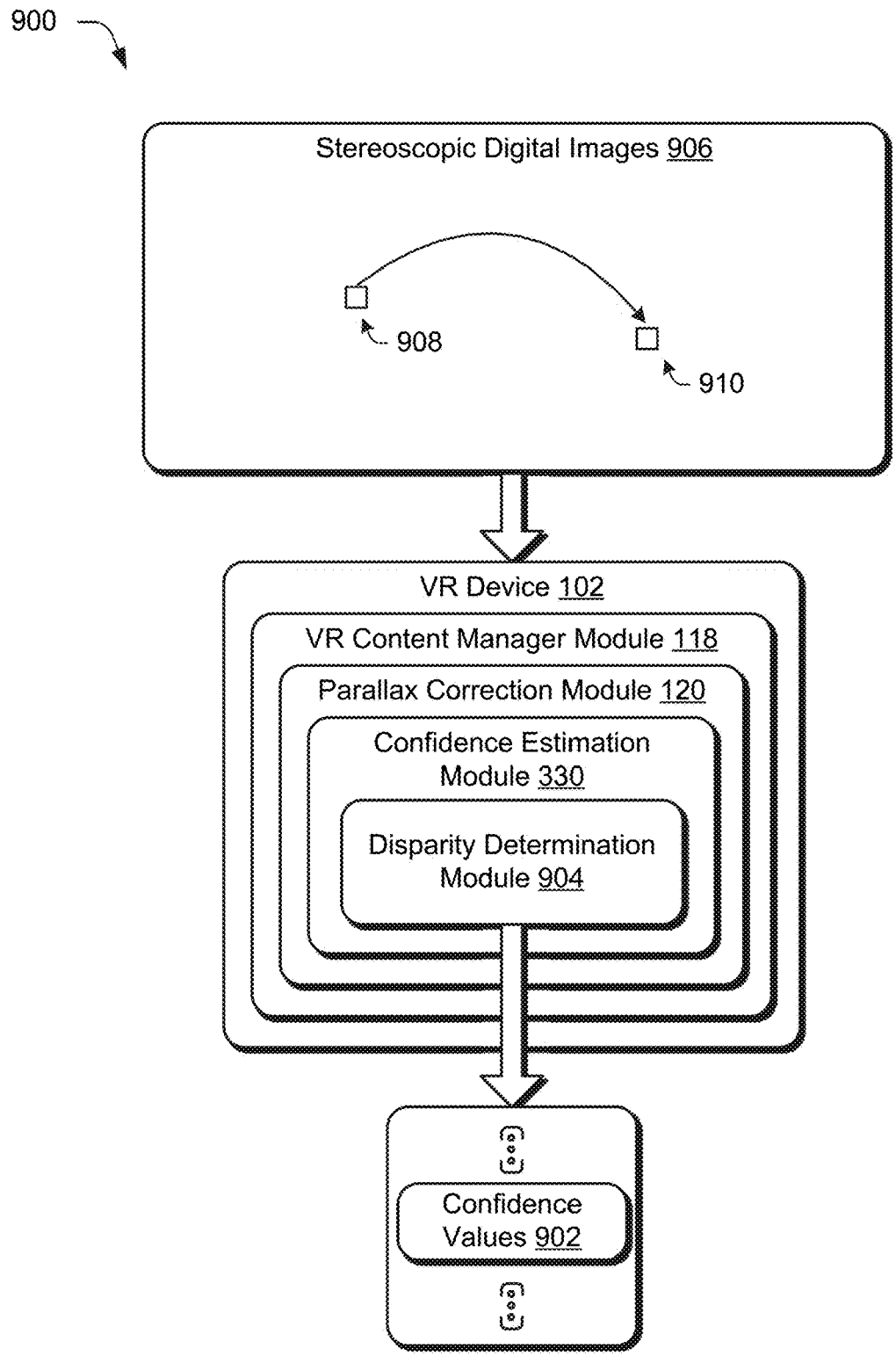
FIGS. 9 and 10 depict example implementations showing operation of a confidence estimation module of the parallax correction module in greater detail.
Figure 10:
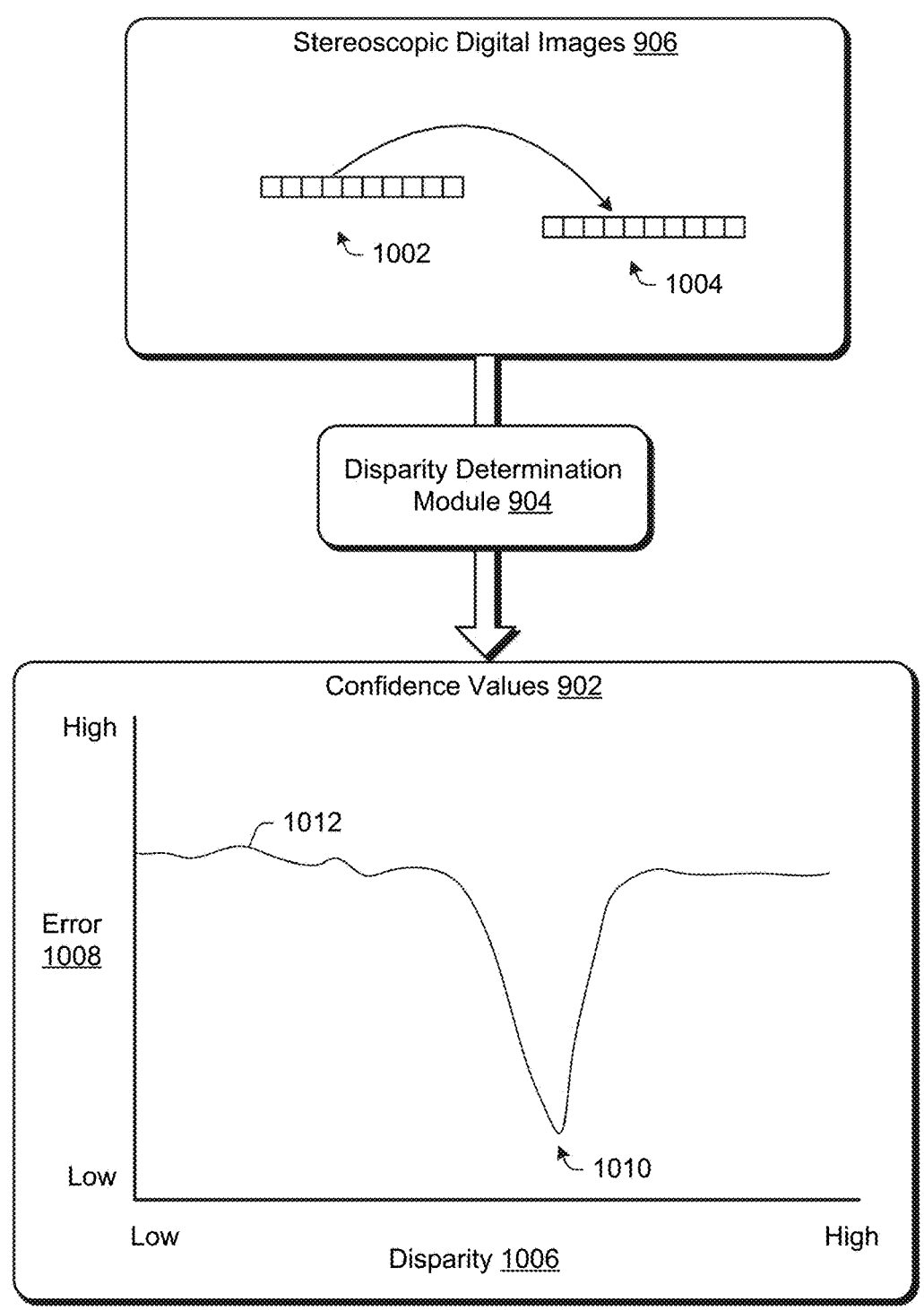
Figure 11:
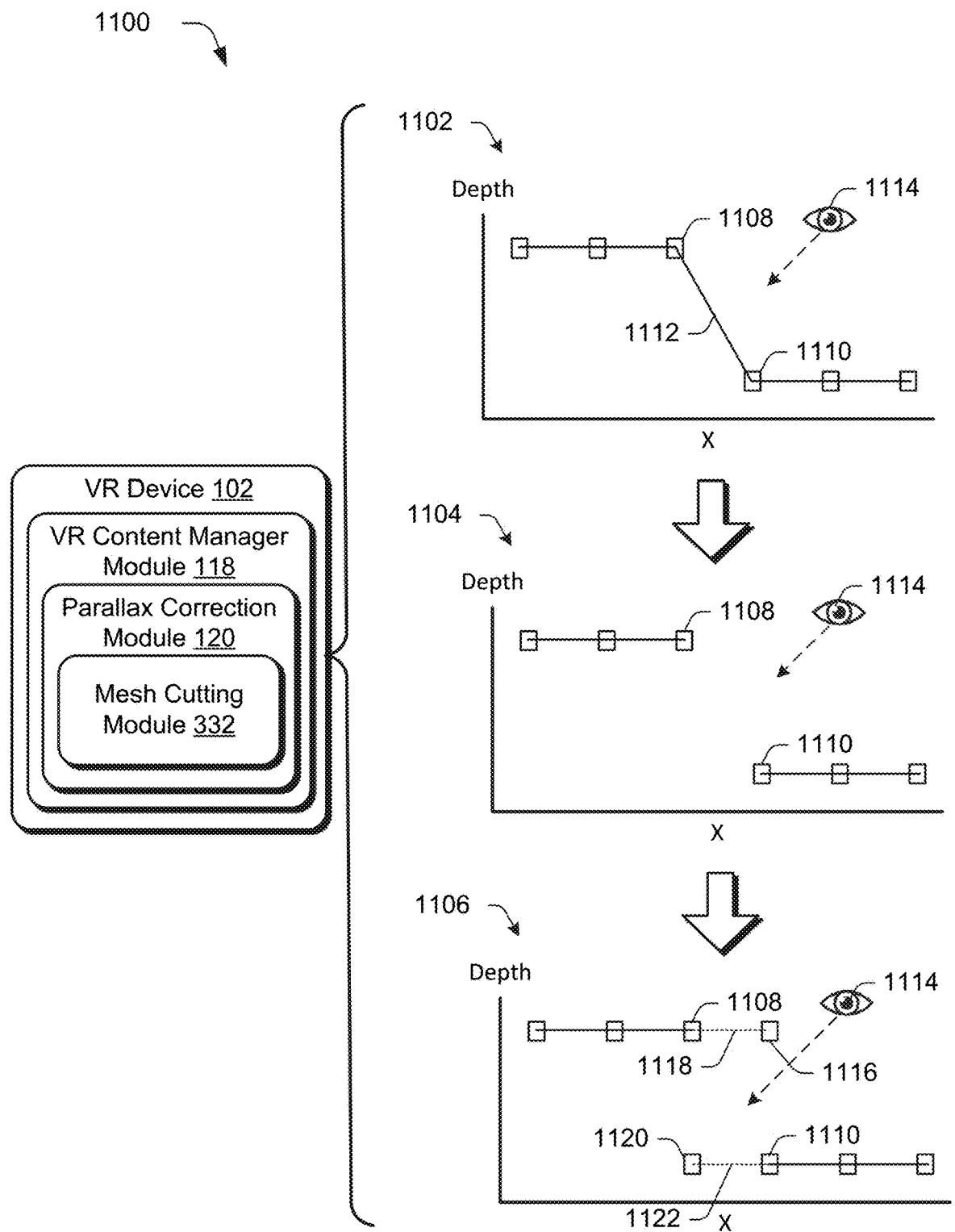
FIG. 11 depicts an example implementation showing operation of a mesh cutting module of the parallax correction module in greater detail.

FIGS. 9 and 10 depict example implementations 900, 1000 showing operation of the confidence estimation module 330 of the parallax correction module 120 in greater detail. Depth maps 124 that accompany digital images 122 as part of VR digital content 106 are presented as a single depth value (e.g., 3D coordinate 128) per pixel 126, without any additional information. However, these depth values are estimates, with some estimates having increased accuracy over other estimates. Accordingly, in this example the confidence estimation module 330 is configured to generate confidence values 902 indicating a likely accuracy of the pixel depth estimate, i.e., an amount of confidence that the estimate is correct.

In this example, the confidence values 902 are generated by a disparity determination module 904 based on how distinct a match is between pixel pairs in stereoscopic digital images 906. That is, for pixel 908 "p" for a stereoscopic image for a left eye of the user 104 with associated depth "d," the corresponding pixel 910 is found for a stereoscopic image for a right eye of the user 104. A neighborhood "N" is examined around "p" to compute a corresponding sum of squared differences (SSD) with the corresponding neighborhood "M" around pixel "q."

As shown in FIG. 10, neighborhoods 1002, 1004 are shifted by varying numbers of pixels left or right, e.g., "M1," "M-1," "M2," "M-2," and so on. An example plot of these confidence values 902 is shown of disparity 1006 against error 1008. A good match and thus high level of confidence has a low SSD at "M" 1010 and a high SSD 1012 at surrounding pixels, e.g., e.g., "M1," "M-1," "M2," "M-2," and so on. On the other hand, a low match has a closer SSD at each location, and thus lower confidence. The difference between the values at "M," "M-1," "M2," "M-2," and so on are quantified as the confidence of depth "d" for pixel "p" as the confidence values 902, regardless of how the depth is originally calculated. These confidence values 902 may then be used to support a variety of functionality, including blurring and mesh cutting as further described below.

FIG. 11 depicts an example implementation 1100 showing operation of the mesh cutting module 334 of the parallax correction module 120 in greater detail. This example implementation 1100 is illustrated using first, second, and third stages 1102, 1104, 1106. Boundary edges identified by the boundary identification module 326 as part of the boundary data 702 or as depth discontinuities 810 in this example are cut. This is done by replacing single mesh triangles that occur "across" the boundary edges and depth discontinuities into two mesh triangles, one for the foreground and one for the background, with vertices at the same "X/Y" positions and different "Z" depths. This may be performed in a variety of ways, such as by a pixel shader implemented by a graphics processing unit to support real time output. This acts to reduce visual artifacts caused by smeared triangles that occur across the boundary edges.

To do so, the mesh cutting module 332 first identifies that pixels 1108, 1110 occur at different sides of a depth discontinuity (e.g., involve different objects) and are connected by an edge 1112 of a mesh triangle across this discontinuity. According, this edge 1112 when viewed by a user from a new viewpoint 1114 that is not the point of origin appears as a visual artifact as shown at the first stage 1102.

At the second stage 1104, this edge 1112 of the mesh is cut by the mesh cutting module 332. Pixel 1116 is then added as having the same X/Y coordinates of pixel 1110 but having a depth that matches pixel 1108, and is connected via edge 1118. Likewise, pixel 1120 is added as having the same X/Y coordinates of pixel 1108, but having a depth that matches pixel 1110, and is connected via edge 1122. In this way, two triangles are formed from the single triangle that caused the visual artifact by cutting the mesh and thereby removing the visual artifact when viewed from the viewpoint 1114.

Figure 12:
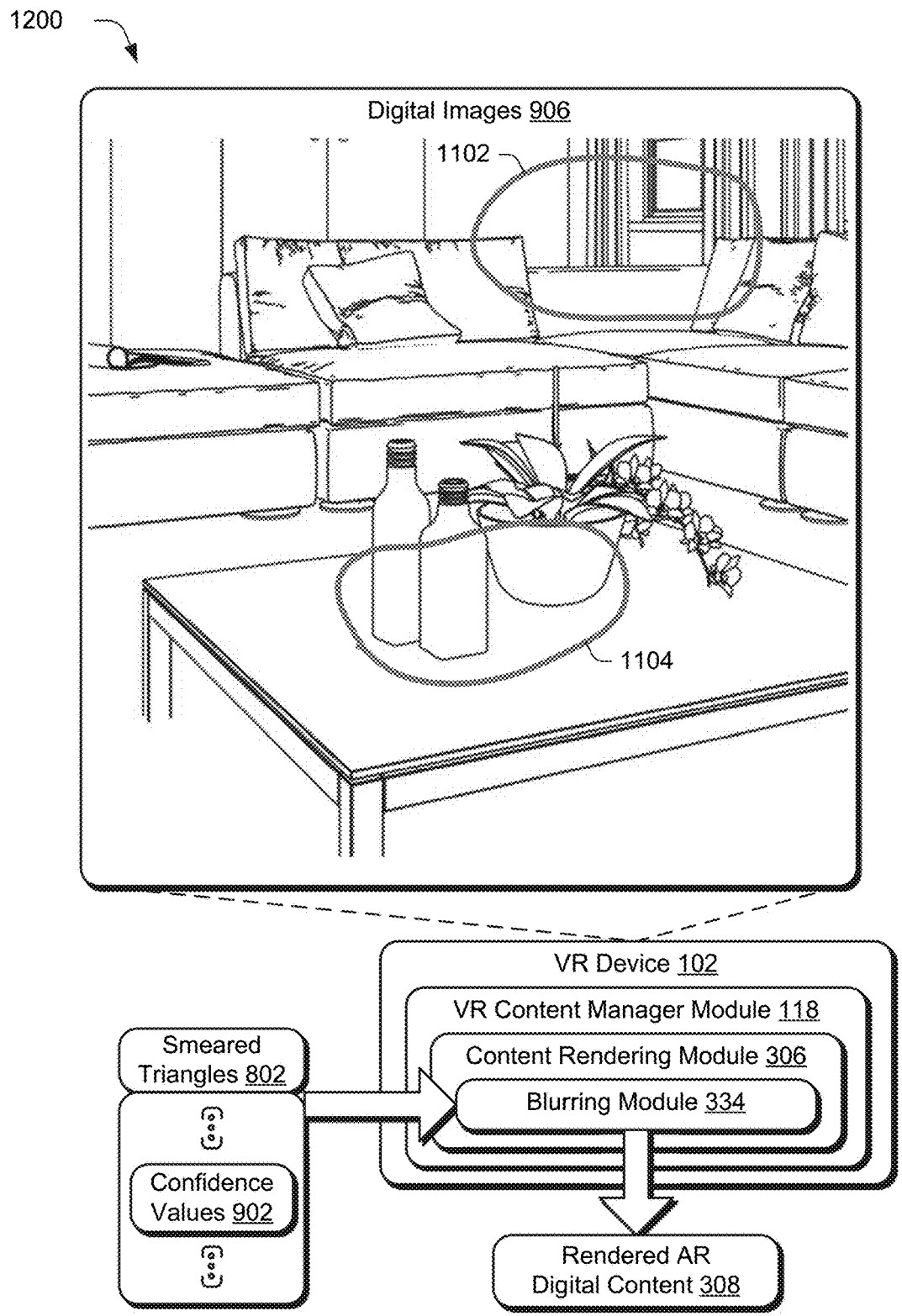
FIG. 12 depicts an example implementation showing operation of a blurring module of a content rendering module of FIG. 3 in greater detail.
Figure 13:
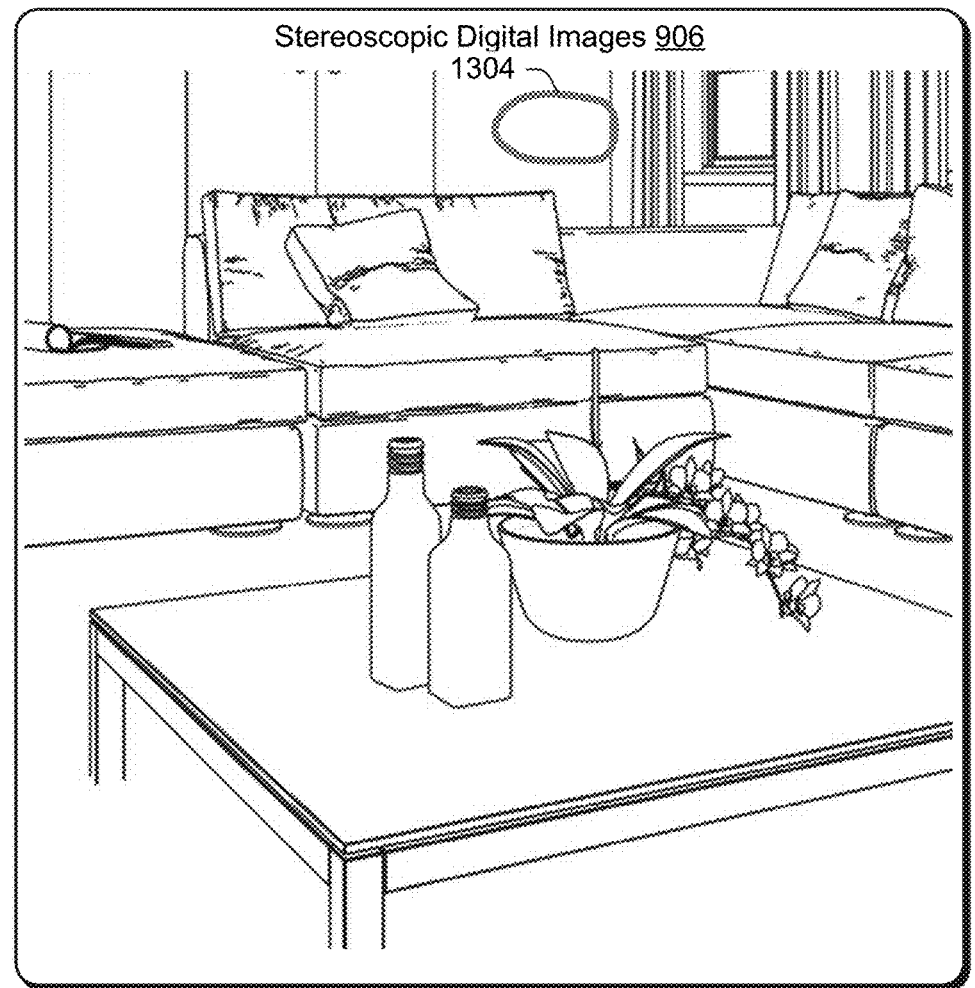
FIG. 13 depicts an example implementation showing operation of an error diffusion module of the content rendering module in greater detail.
Figure 13:
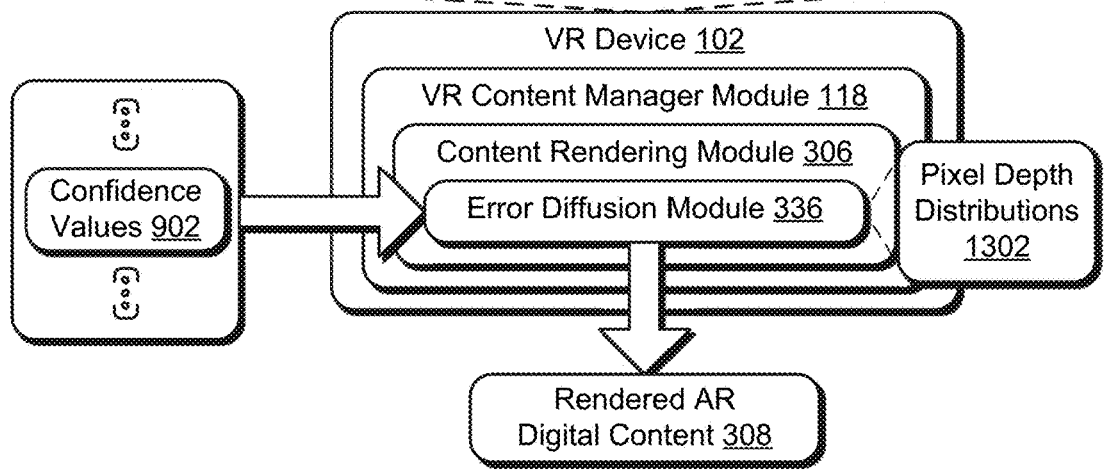

FIG. 12 depicts an example implementation 1200 showing operation of the blurring module 334 of the content rendering module 306 in greater detail. Visual artifacts caused in generation of the perspective triangle mesh 320 to support a new viewpoint in relation to output of the VR digital content 106 have a greater effect on a user's 104 experience when salient or perceptible. For example, some types of visual artifacts are more salient than others, e.g., high contrast edges and temporal jitter. On the other hand, blurriness is a visual artifact that is less salient, i.e., is less noticeable to the user 104.

Accordingly, in this example the blurring module 334 is used to identify an area 1202 that may contain artifacts and an area 1204 that does not contain artifacts. This may be performed in a variety of ways, such as based on the smeared triangles 802 or the confidence values 902 computed as described previously. The blurring module 334, for instance, may apply a filter to the area 1202 that contains artifacts but not to the area 1204 that does not. This may be done through use of a per-pixel Gaussian blur where the radius is a function of the inverse of the confidence values 902 of the pixels. In this way, visibility of the artifacts is reduced by the blurring module 334, and may do so in real time.

FIG. 13 depicts an example implementation 1300 showing operation of the error diffusion module 336 of the content rendering module 306 in greater detail. In the previous example, confidence values 902 are generated to estimate a quality of a match. In this example, an error diffusion module 336 is used to generate pixel depth distributions 1302 to estimate a range of acceptable quality of matches, where for each disparity neighborhood the SSD is below a threshold. For good matches, this range is a single disparity. However, in regions lacking texture (e.g., for a wall 1304) this range may be large. In such an instance, the depth is ambiguous and is therefore expressed as a range of values for those pixels through use of the pixel depth distributions 1302.

Thus, a pixel in the perspective triangle mesh 320 is rendered by the content rendering module 306 at an exact depth if the confidence value is high, or is smeared along a line based on a range of depths it may occupy as specified by the pixel depth distributions 1302. This creates natural smearing that shows the correct ambiguity in the stereo result and thus acts to correct parallax as part of the rendered VR digital content 308.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-11.

Figure 14:
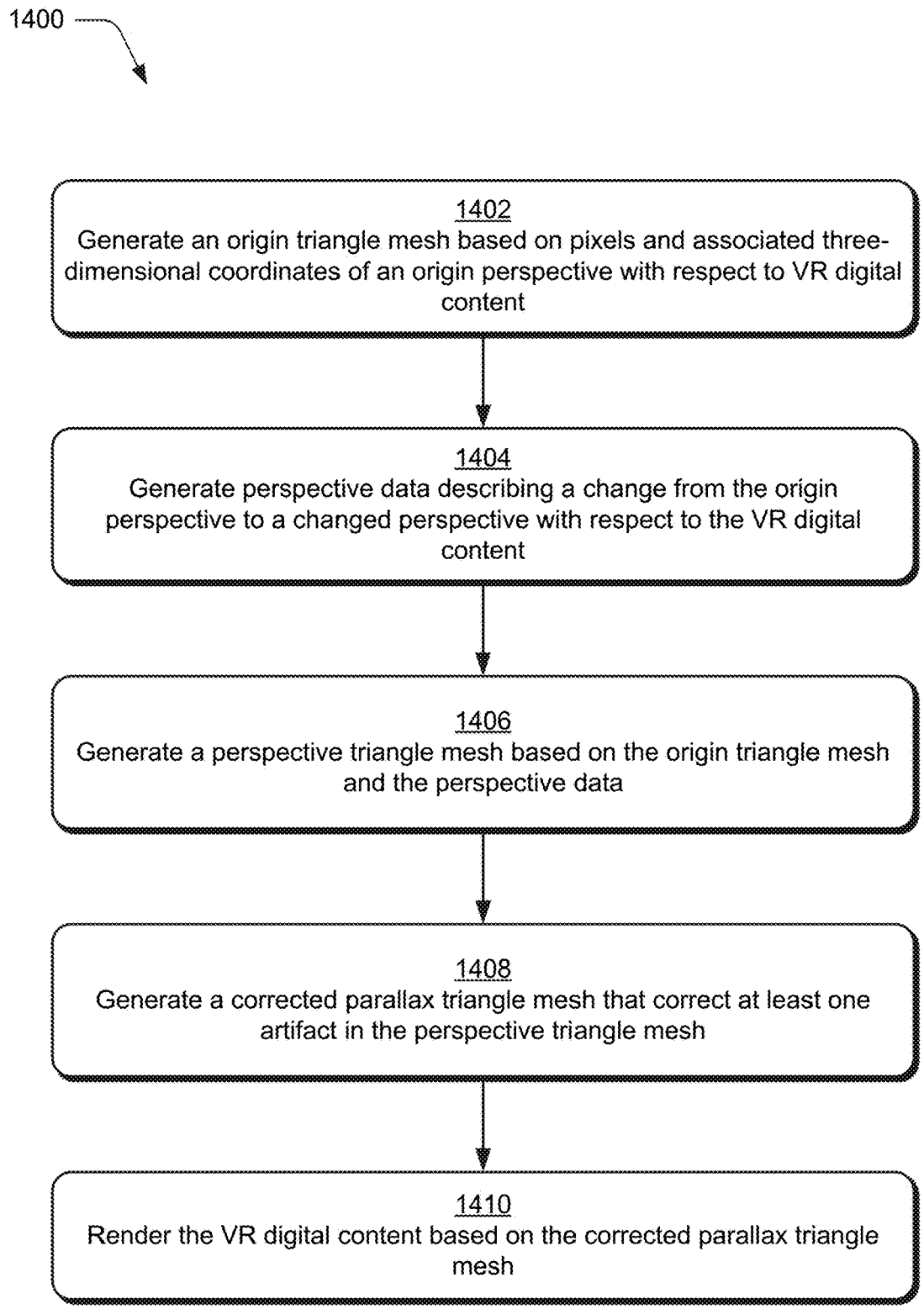
FIG. 14 is a flow diagram depicting a procedure in an example implementation in which parallax corrections are made to virtual reality digital content to support a change in perspective.

FIG. 14 depicts a procedure 1400 in an example implementation in which parallax corrections are made to virtual reality digital content to support a change in perspective. An origin triangle mesh 304 is generated by a triangle mesh generation module 302 based on pixels 126 and associated three-dimensional coordinates 128 of an origin perspective with respect to the VR digital content 106 (block 1402).

Perspective data 316 is generated describing a change from the origin perspective to a changed perspective with respect to the VR digital content (block 1404). The perspective detection module 310, for instance, may obtain data via an application programming interface from sensors 116 that are usable to detect a change in position away from the point of origin and thus a change in perspective with respect to the VR digital content 106.

A perspective triangle mesh 320 is generated based on the origin triangle mesh 304 and the perspective data 316 (block 1406) to address this change is position and perspective. A corrected parallax triangle mesh 322 is then generated by the parallax correction module 120 that corrects at least one artifact in the perspective triangle mesh (block 1408). Examples of this functionality are represented by corresponding modules include a depth filtering module 324 (FIG. 6), boundary identification module 326 (FIG. 7), smear detection module 328 (FIG. 8), confidence estimation module 330 (FIGS. 9 and 10), and mesh cutting module 332 (FIG. 11). The VR digital content is rendered 308 based on the corrected parallax triangle mesh 322 (block 1410) by a content rendering module 306 for display by the display device 114, e.g., as stereoscopic digital images for viewing by respective eyes of the user 104. This may include rendering as employing a blurring module 334 (FIG. 12) and error diffusion module 336 (FIG. 13).

Example System and Device

Figure 15:
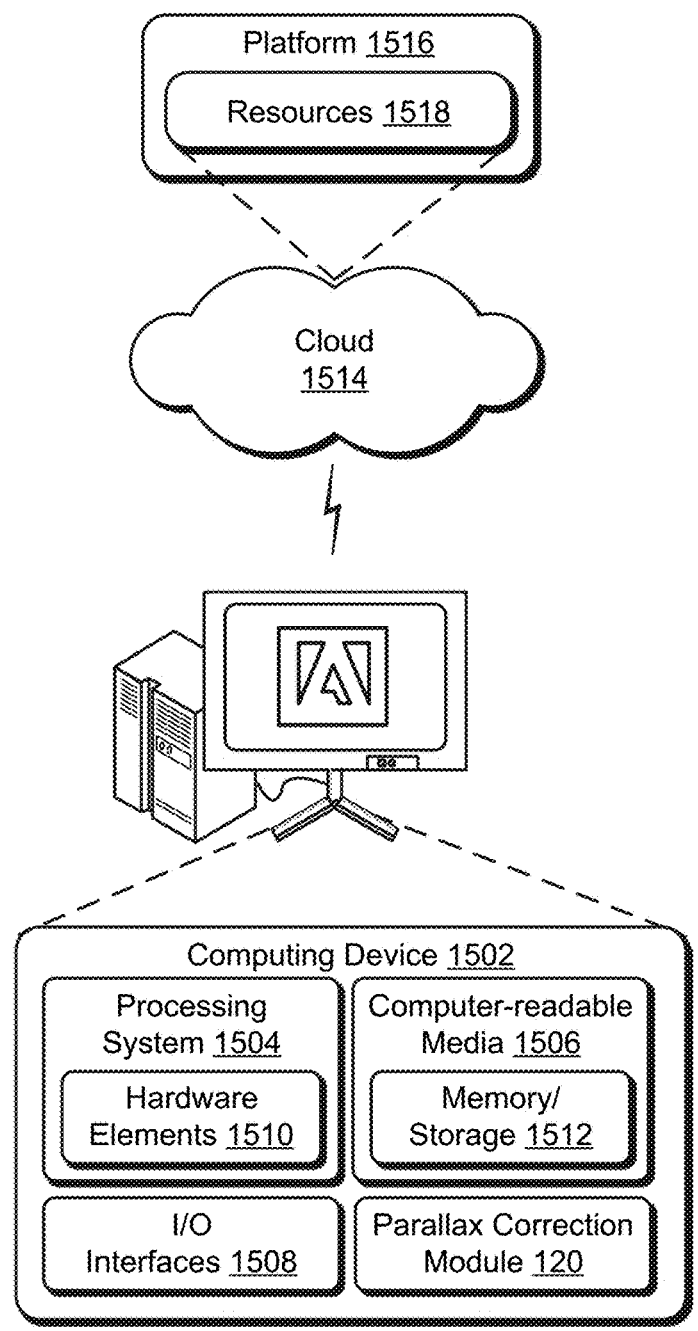
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the parallax correction module 120. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to correct parallax to address changes in perspective in relation to virtual reality (VR) digital content, a system comprising:
a triangle mesh generation module implemented by a processing system of the VR system to generate an origin triangle mesh based on pixels and associated three-dimensional coordinates of an origin perspective with respect to the VR digital content;
a perspective detection module implemented by the processing system of the VR system to generate perspective data describing a change from the origin perspective to a changed perspective with respect to the VR digital content;
a perspective alteration module implemented by the processing system of the VR system to generate a perspective triangle mesh based on the origin triangle mesh and the perspective data;
a parallax correction module implemented by the processing system of the VR system to generate a corrected parallax triangle mesh that corrects at least one artifact in the perspective triangle mesh based on identification of depth boundaries as part of machine learning through use of a neural network; and
a content rendering module implemented by the processing system of the VR system to render the VR digital content based on the corrected parallax triangle mesh.

2. The system as described in claim 1, wherein the parallax correction module further comprises a depth filtering module to generate the corrected parallax triangle mesh based at least in part on depth filtering.

3. The system as described in claim 1, wherein the parallax correction module further comprises a smear detection module to generate the corrected parallax triangle mesh based at examination of triangles included as part of the perspective triangle mesh.

4. The system as described in claim 3, wherein the examination by the smear detection module is based on a surface normal approximating a view direction of a respective said triangle, a length of an edge of the respective said triangle, or an area of the respective said triangle.

5. The system as described in claim 1, wherein the parallax correction module further comprises a confidence estimation module to generate confidence values associated with depths of pixels of the perspective triangle mesh.

6. The system as described in claim 5, wherein the confidence values are based at least in part on disparity of the pixels in respective stereoscopic images as part of the VR digital content.

7. The system as described in claim 5, further comprising a blurring module that is configured to blur portions of VR digital content based on respective said confidence values for pixels in respective said portions.

8. The system as described in claim 7, wherein an amount of the blurring of the portions increases for portions that have low confidence values and decreases for portions that have high confidence values.

9. The system as described in claim 1, wherein the parallax correction module further comprises an error diffusion module to generate the corrected parallax triangle mesh in which a depth of at least one pixel is described as a distribution of a range of depth values.

10. The system as described in claim 1, wherein the parallax correction module further comprises a mesh cutting module to cut the perspective triangle mesh based on identified boundary edges or depth discontinuities.

11. In a digital medium environment to correct parallax to address changes in perspective in relation to virtual reality (VR) digital content, a method implemented by a virtual reality (VR) device, the method comprising:
generating, by the virtual reality device, an origin triangle mesh based on pixels and associated three-dimensional coordinates of an origin perspective with respect to the VR digital content;
generating, by the virtual reality device, perspective data describing a change from the origin perspective to a changed perspective with respect to the VR digital content;
generating, by the virtual reality device, a perspective triangle mesh based on the origin triangle mesh and the perspective data;
generating, by the virtual reality device, a corrected parallax triangle mesh that corrects at least one artifact in the perspective triangle mesh by cutting the perspective triangle mesh based on identified boundary edges or depth discontinuities; and
rendering, by the virtual reality device, the VR digital content based on the corrected parallax triangle mesh.

12. The method as described in claim 11, wherein the generating of the corrected parallax triangle mesh is based at least in part on depth filtering.

13. The method as described in claim 11, wherein the generating of the corrected parallax triangle mesh is based at least in part on identification of depth boundaries as part of machine learning through use of a neural network.

14. The method as described in claim 11, wherein the generating of the corrected parallax triangle mesh is based at least in part on examining triangles included as part of the perspective triangle mesh.

15. The method as described in claim 14, wherein the examining is based on a surface normal approximating a view direction of a respective said triangle, a length of an edge of the respective said triangle, or an area of the respective said triangle.

16. The method as described in claim 11, wherein the generating of the corrected parallax triangle mesh is based at least in part on generating confidence values associated with depths of pixels of the perspective triangle mesh.

17. The method as described in claim 16, further comprising blurring portions of VR digital content based on respective said confidence values for pixels in respective said portions.

18. The method as described in claim 11, wherein the generating of the corrected parallax triangle mesh is based at least in part on generating the corrected parallax triangle mesh in which a depth of at least one pixel is described as a distribution of a range of depth values.

19. In a digital medium environment to correct parallax to address changes in perspective in relation to virtual reality (VR) digital content, a method comprising:
generating by a processing system an origin triangle mesh based on pixels and associated three-dimensional coordinates of an origin perspective with respect to the VR digital content;
generating by the processing system perspective data describing a change from the origin perspective to a changed perspective with respect to the VR digital content;

generating by the processing system a perspective triangle mesh based on the origin triangle mesh and the perspective data;

generating by the processing system a corrected parallax triangle mesh that corrects at least one artifact in the perspective triangle mesh based on identification of depth boundaries as part of machine learning through use of a neural network; and rendering by the processing system the VR digital content based on the corrected parallax triangle mesh.

20. The method as described in claim 19, wherein the generating of the correct parallax triangle further comprises cutting the perspective triangle mesh based on identified boundary edges or depth discontinuities.

\* \* \* \* \*